United States Patent
Ishii et al.

(10) Patent No.: US 7,373,279 B2
(45) Date of Patent: May 13, 2008

(54) NETWORK

(75) Inventors: Toru Ishii, Hirakata (JP); Motoi Nakanishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 10/574,622

(22) PCT Filed: Jul. 4, 2005

(86) PCT No.: PCT/JP2005/012306

§ 371 (c)(1),
(2), (4) Date: Apr. 5, 2006

(87) PCT Pub. No.: WO2006/018935

PCT Pub. Date: Feb. 23, 2006

(65) Prior Publication Data

US 2007/0043891 A1   Feb. 22, 2007

(30) Foreign Application Priority Data

Aug. 19, 2004   (JP)   ............... 2004-239856
Aug. 19, 2004   (JP)   ............... 2004-239857

(51) Int. Cl.
*G06F 17/40* (2006.01)
*G06F 19/00* (2006.01)

(52) U.S. Cl. .................. 702/187; 702/1; 702/108; 702/121; 702/122; 702/127; 709/223; 709/232; 709/235

(58) Field of Classification Search ............... 702/108, 702/121, 122; 709/223, 224, 225, 232, 235, 709/253
See application file for complete search history.

(56) References Cited

U.S. PATENT DOCUMENTS 3,641,274 A * 2/1972 Sasaki et al. ............... 370/324
4,827,474 A * 5/1989 Le Goffic et al. ........... 370/347
4,831,558 A * 5/1989 Shoup et al. ............... 702/188

(Continued)

FOREIGN PATENT DOCUMENTS

GB   2 236 606 A  * 4/1991

(Continued)

OTHER PUBLICATIONS

International Search Report from PCT/JP2005/012306, Aug. 30, 2005 ( with English Translation).

*Primary Examiner*—Edward R Cosimano
(74) *Attorney, Agent, or Firm*—Dickstein Shapiro LLP

(57) ABSTRACT

A network including a bus through which data is transmitted and a plurality of network devices connected to the bus to form the network. In the network, at least one of the network devices performs measurement at timings in a predetermined cycle T and outputs data concerning the measurement result on the bus. Another network device detects the cycle T in which the data concerning the measurement result is output, performs measurement at the timings in the predetermined cycle T, and outputs the measurement result on the bus.

5 Claims, 7 Drawing Sheets

U.S. PATENT DOCUMENTS

| | | | |
|---|---|---|---|
| 5,873,044 A * | 2/1999 | Goldberg et al. | 455/503 |
| 5,974,106 A * | 10/1999 | Dupont et al. | 375/377 |
| 7,042,844 B2 * | 5/2006 | Rasanen et al. | 370/232 |
| 7,317,382 B2 * | 1/2008 | Pratt et al. | 340/428 |
| 2002/0093914 A1 * | 7/2002 | Rasanen et al. | 370/232 |
| 2004/0081088 A1 * | 4/2004 | Schinner et al. | 370/229 |
| 2005/0094674 A1 * | 5/2005 | Zinke et al. | 370/507 |
| 2006/0030345 A1 * | 2/2006 | Jain et al. | 455/515 |

FOREIGN PATENT DOCUMENTS

| | | |
|---|---|---|
| JP | 57-118456 | 7/1982 |
| JP | 2-81550 A * | 3/1990 |
| JP | 5-159191 | 6/1993 |
| JP | 6-94779 | 4/1994 |
| JP | 10-84365 A * | 3/1998 |
| JP | 10-97506 | 4/1998 |
| JP | 10-111151 | 4/1998 |
| JP | 2003-242583 | 8/2003 |

* cited by examiner

NETWORK

FIELD OF THE INVENTION

The present invention relates to a network over which various sensors in a system, such as a motor car, perform data communication.

BACKGROUND OF THE INVENTION

For example, in-vehicle sensors, including a collision avoidance radar, a sensor for measuring the number of rotations of wheels, and a sensor for detecting the rudder angle of a steering wheel, have heretofore been networked over, for example, a controller area network (CAN) bus.

In such a network over which multiple sensors are connected to the bus, the sensors must be synchronized with each other in order to improve the transmission efficiency of the bus and to cause the sensors to perform the measurement in accordance with a common time base.

Networks in which sensors connected to a bus operate in synchronization with each other are disclosed in Patent Documents 1 to 3.

Patent Document 1 discloses a network in which an uppermost-stream data transmission device generates a synchronization signal indicating a timing of data acquisition and each downstream data transmission device samples a signal from a current sensor on the basis of a sampling signal generated by correcting the synchronization signal based on a propagation delay time.

Patent Document 2 discloses a network including multiple computer terminals and a time-management computer terminal (reference terminal), which measures a reference time for all the computer terminals connected over the network. In this network, when a measurement computer receives a processing request from the time management computer terminal, the measurement computer records the measurement data output from the sensors in the measurement computer, along with time information that is received.

Patent Document 3 discloses a system in which a sensor connected to a network follows a measurement sequence in accordance with a trigger signal generated by another sensor to perform measurement and calculation. In this system, the sensor is capable of performing a predetermined measurement operation in synchronization with the trigger signal supplied from the other sensor.

Patent Document 1: Japanese Unexamined Patent Application Publication No. 6-94779

Patent Document 2: Japanese Unexamined Patent Application Publication No. 10-97506

Patent Document 3: Japanese Unexamined Patent Application Publication No. 10-111151

However, the network disclosed in Patent Document 1 can be used only under the condition that a constant propagation delay time is always ensured. In other words, the network cannot be used if the timing when the data is output to the network can be varied due to, for example, bus arbitration.

Since the reference clock (the time management computer terminal) for the synchronization is required in the network disclosed in Patent Document 2, the network becomes complicated and is increased in cost.

Since the device for generating the trigger signal is required for every sensor in the network disclosed in Patent Document 3, the system becomes complicated and is increased in cost. In addition, since each sensor operates on the basis of the trigger signal generated by another sensor, the measurement and calculation times of a certain sensor cannot be determined. Accordingly, after one sensor completes the measurement and calculation, another sensor operates. As a result, there is a problem in that it is not possible to concurrently operate multiple sensors and, therefore, a higher usability of the network cannot be achieved.

SUMMARY OF THE INVENTION

An object of the present invention is to provide a network in which network devices can be synchronized with each other even when the time management is not centralized.

In order to solve the above problems, the present invention is structured in the following manner.

(1) In a network according to an aspect of the present invention, including a bus through which data is transmitted and a plurality of network devices connected to the bus, at least one of the plurality of network devices includes measurement means for measuring a certain variate in a predetermined measurement cycle and data output means for outputting a result measured by the measurement means on the bus and at least another one of the plurality of network devices includes means for detecting the predetermined cycle from a plurality of timings when the measurement result is output on the bus, measurement means for measuring a certain variate at measurement timings on the basis of the predetermined cycle, and data output means for outputting a result measured by the measurement means on the bus.

(2) In a network according to another aspect of the present invention, including a bus through which data is transmitted and a plurality of network devices connected to the bus, at least one of the plurality of network devices includes measurement means for measuring a certain variate at measurement timings on the basis of a predetermined reference timing and data output means for adding information concerning the measurement timings to a result measured by the measurement means and outputting the result on the bus.

(3) In the network according to the present invention, at least another one of the network devices includes measurement means for measuring a certain variate at measurement timings that are determined on the basis of the measurement timing information added to the measurement result with respect to a base time when the measurement result is output, and data output means for outputting a result measured by the measurement means on the bus.

(4) In the network according to the present invention, the predetermined reference timing is a timing generated by at least one of the network devices.

(5) In the network according to the present invention, the predetermined reference timing is a timing when a certain network device, among the plurality of network devices, outputs a signal on the bus.

Advantages (1) At least one (a first network device) of the multiple network devices measures a certain variate in a predetermined measurement cycle and outputs the measurement result on the bus. Accordingly, at least another one (a second network device) of the network devices can detect the measurement cycle of the first network device from multiple timings when the measurement result is output on the bus and can perform the measurement at the measurement timings on the basis of the predetermined cycle. As a result, the first and second network devices can perform the measurement in synchronization with each other.

(2) At least one of the multiple network devices measures a certain variate at measurement timings on the basis of a predetermined reference timing by the measurement means and adds information concerning the measurement timings to a result measured by the measurement means to output the result on the bus by the data output means. Accordingly, the network device that has read the data output on the bus not only knows the measurement result but also knows the reference timing, on which the measurement timings are based, from the read timing and the added information concerning the measurement timings. Hence, the multiple network devices connected to the bus can operate in synchronization with each other without using a control line for synchronization control or a reference clock.

(3) At least one (the first network device) of the multiple network devices performs the measurement at measurement timings that are determined on the basis of the measurement timing information added to the measurement result with respect to a base time when the measurement result is output, and adds the measurement timing information to the measurement result to output the measurement result on the bus. Accordingly, the network device (the second network device) that has read the data output on the bus can know the measurement and calculation timings (the measurement timing information) of the first network device. Hence, the second network device can determine timings when the second network device starts the measurement by calculating back the output timings by the first network device on the bus. As a result, the first and second network devices can perform the measurement in synchronization with each other.

According to the present invention, the "synchronization" is not limited to synchronous operation and may be a state in which multiple network devices operate at predetermined timings.

(4) Performing the measurement by using the timing generated by the network device as the reference timing allows the present invention to be applied to a case where no device generating a reference timing signal exists, thus simplifying the entire structure of the network.

(5) Using a timing when a certain network device, among the plurality of network devices, outputs a signal on the bus as the reference timing eliminates the need to provide a device generating the reference timing in the network, thus simplifying the entire structure of the network.

Figure 1:
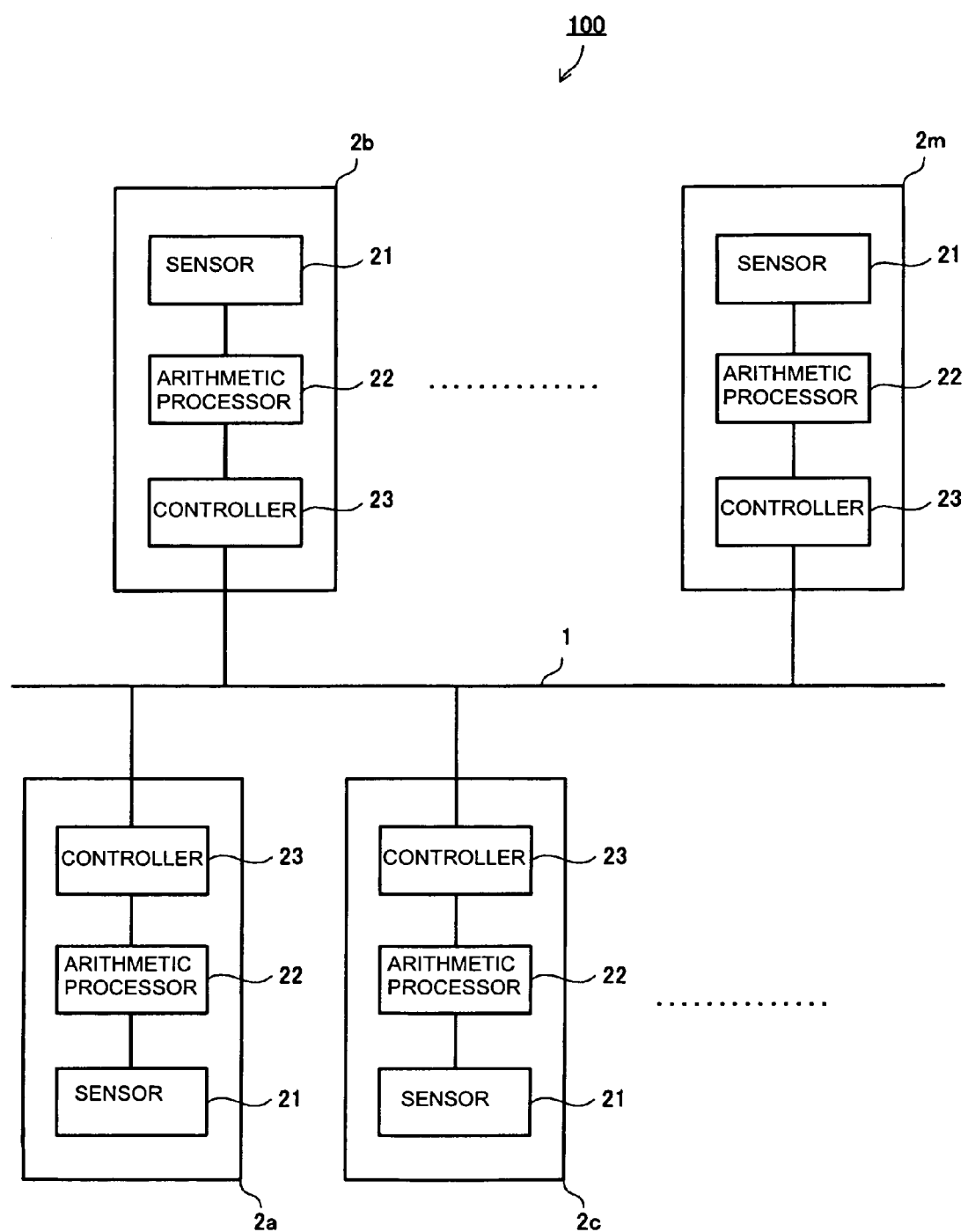
FIG. 1 is a block diagram showing the structure of a network according to first to third embodiments.

REFERENCE NUMERALS 1 bus
2x Snetwork device e, where x indicates a device number from "a" "m"
100 network

DETAILED DESCRIPTION OF THE INVENTION

A network according to a first embodiment will be described with reference to FIGS. 1 to 3.

FIG. 1 is a block diagram showing the entire structure of the network. Referring to FIG. 1, a bus 1 is, for example, a twisted pair cable or an optical fiber cable and data is transmitted over the bus 1. Multiple network devices 2a, 2b, 2c, ... 2m are connected to the bus 1. The network devices basically have the same structure in the example shown in FIG. 1. Each network device has a sensor 21, an arithmetic processor 22, and a controller 23. The sensor 21 measures a certain variate. The controller 23 detects the state of a signal on the bus 1 to control input and output of the data. The arithmetic processor 22 performs predetermined arithmetic processing for the result of the measurement by the sensor 21, outputs the result data through the controller 23, and performs predetermined timing control.

The sensors in the multiple network devices 2a, 2b, 2c, ... 2m include, for example, a radar for detecting a target forward a motor car, a radar for detecting a target backward the motor car, a sensor for the rudder angle of the steering wheel of the motor car, an orientation sensor of the car body, an acceleration sensor of a yaw rate, etc., an accelerator sensor, and a brake sensor.

Figure 2:
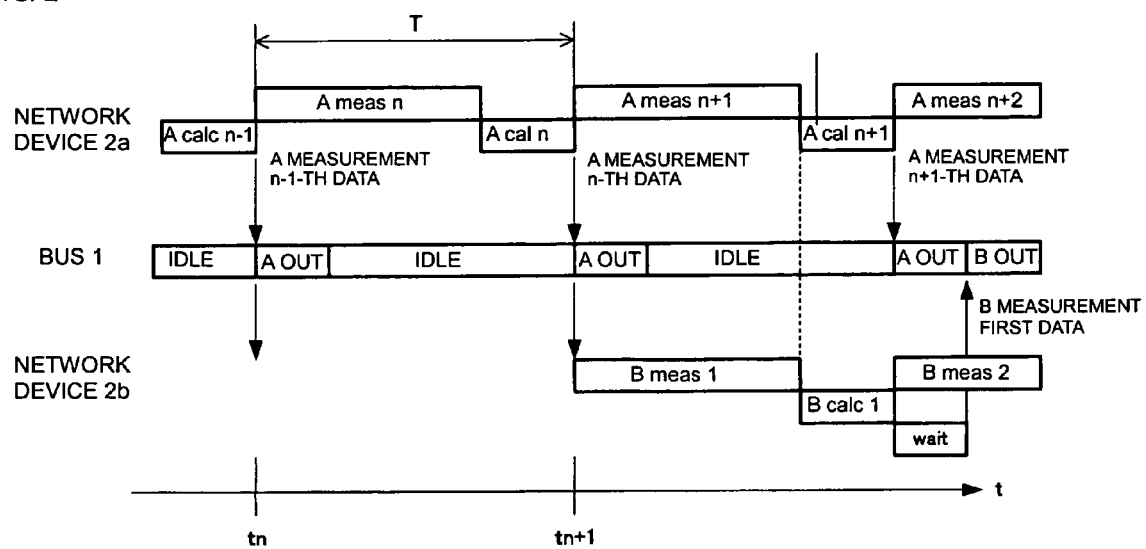
FIG. 2 is a timing chart showing how a bus and network devices operate in the network according to the first embodiment.

FIG. 2 is a timing chart of the bus 1 and the network devices 2a and 2b in the network 100 in FIG. 1. For example, the network device 2a is a forward looking radar for monitoring a target forward the motor car and the network device 2b is a neighborhood radar for monitoring a target around the motor car. The network devices 2a and 2b repeat measurement at the same timings in a predetermined cycle in the example in FIG. 2.

The network device 2a starts the measurement ("A measurement n") at a timing "tn" followed by calculation ("A calculation n") and outputs data ("A output") on the bus immediately after the "A calculation n". Simultaneously with the data output, the network device 2a starts the subsequent measurement ("A measurement n+1") followed by the calculation ("A calculation n+1") and outputs the data ("A output") on the bus immediately after the "A calculation n+1". The network device 2a repeats the measurement and calculation in a predetermined cycle "T" in the above manner. The measurement timing of the network device 2a is unknown to the network device 2b at first.

After starting the operation, the network device 2b detects the timing when the "A output" is output on the bus 1. This detection is performed by normally enabling a timer built in the network device 2b and reading out a value of the built-in timer at a time when data given the ID of the network device 2a is detected.

After the timing "tn" when the data "A output" is output is detected, the network device 2b waits for detection of the subsequent "A output" to acquire a new timing "tn+1" when the data is output.

At this time, the network device 2b knows the timing "tn+1" when the network device 2a starts the measurement and a measurement cycle "T" (T=tn+1−tn).

Accordingly, the network device 2b immediately starts the measurement at the timing tn+1, performs the measurement ("B measurement 1") over approximately the same time period as that of the network device 2a, and performs calculation ("B calculation 1"). Since the network device 2a also terminates the calculation substantially simultaneously with termination of the "B calculation 1", the network device 2b waits for termination of the data output from the network device 2a and, then, outputs data "B output".

The network device 2b performs the measurement in synchronization with the measurement timings of the network device 2a in the manner described above.

Although the network device 2a performs the measurement at the same timings as those of the network device 2b, the network device 2b may delay start of the measurement for a predetermined time after detecting the measurement timing of the network device 2a, thereby alternately performing the measurement by the network device 2a and the measurement by the network device 2b. The alternate measurement can prevent interference in transmission and reception of millimeter waves when the network device 2a and the network device 2b, serving as millimeter-wave radars, detect the millimeter waves.

Figure 3:
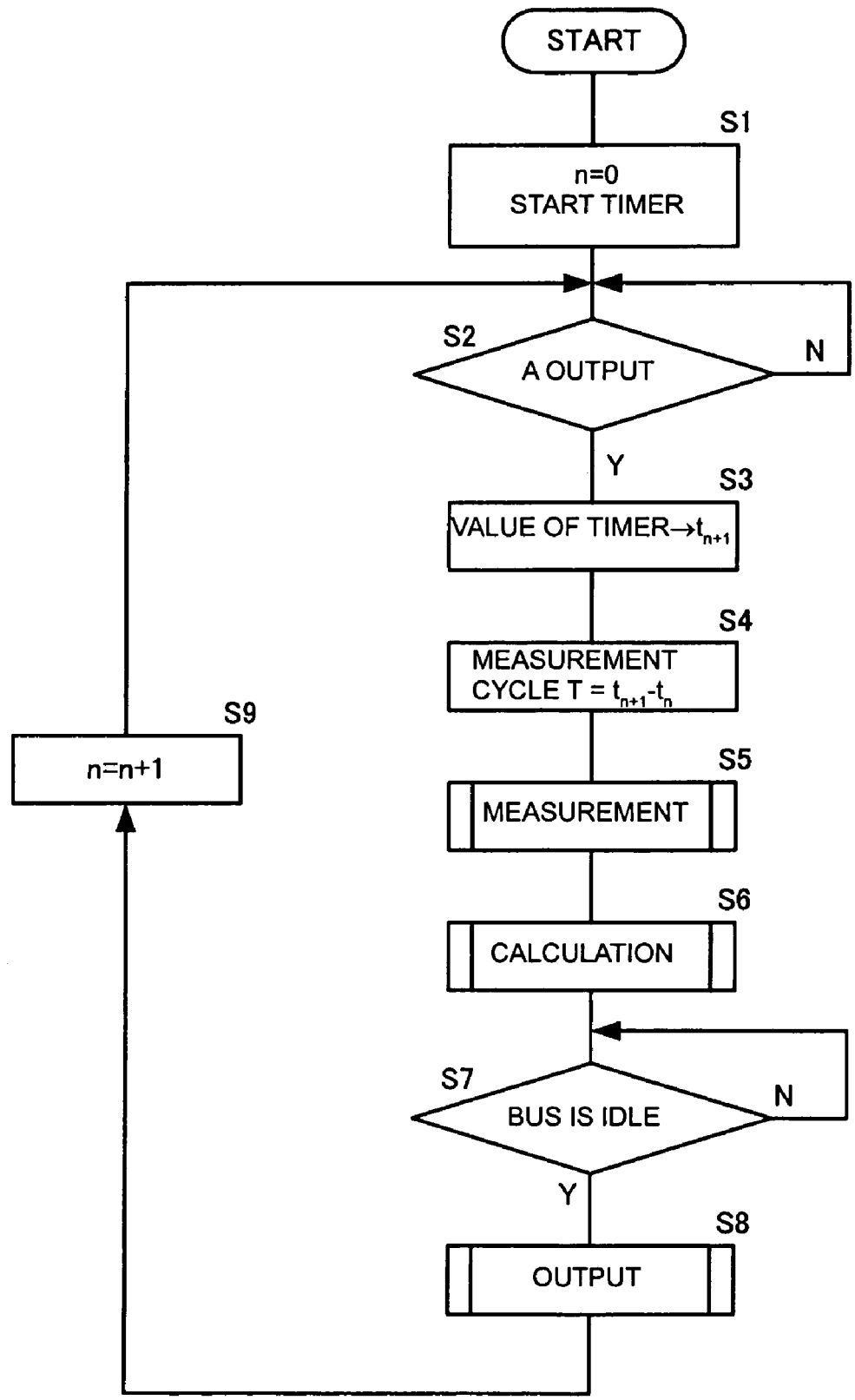
FIG. 3 is a flowchart showing a process of an arithmetic processor in a certain network device in the network according to the first embodiment.

FIG. 3 is a flowchart showing a process of the arithmetic processor 22 in the network device 2b. First, the arithmetic processor 22 substitutes an initial value of zero for a counted value "n" indicating how many times the measurement and the data output have been performed and starts the built-in timer (S1). Then, the arithmetic processor 22 waits until it is determined whether the "A output" is started to be output on the bus 1 (S2). If the controller 23 detects that the "A output" is started to be output on the bus 1, the arithmetic processor 22 holds the value of the built-in timer as "tn+1" (S3). The arithmetic processor 22 calculates a difference between the value "tn+1" and the detected timing "tn", which is the timing when the "A output" is started, as a measurement cycle "T" (S4).

After the arithmetic processor 22 measures the millimeter wave, the arithmetic processor 22 performs the calculation to yield a measurement result (S5→S6). Then, the arithmetic processor 22 determines whether the bus is idle. If the arithmetic processor 22 determines that the bus is not idle, the arithmetic processor 22 waits for the bus to be idle and outputs the measurement data "B output" on the bus 1 (S7→S8).

In preparation for the subsequent measurement and data output, the arithmetic processor 22 increments the counted value "n" by one and waits for start of the subsequent "A output" (S9→S2).

The network device 2a and the network device 2b repeat the measurement and calculation in the same cycle by repeating the above process.

Although the network device 2a and the network device 2b are exemplified in the above example, the same applies to other network devices other than the network device 2a and the network device 2b. That is, each network device may detect the "A output" and may calculate the measurement and calculation cycle "T" of the network device 2a to perform the measurement and calculation in synchronization with the measurement and calculation cycle of the network device 2a.

Independently of whether the "A calculation n+1" terminates simultaneously with the "B calculation 1" or whether the "B calculation 1" terminates slightly earlier than the "A calculation n+1", always providing a predetermined waiting time after the network device 2b terminates the "B calculation 1" causes the "B output" to be output after the "A output", and the "B output" is always output in the cycle "T". Accordingly, the other network devices may detect the timing when the "B output" is started and the cycle "T". This allows the other network devices to be synchronized with the measurement and calculation timing of the network device 2a and the network device 2b.

In the example in FIG. 2, when the "A output" is output on the bus, the network device 2b performs the "B measurement" in synchronization with the "A measurement" on the basis of the timing of the "A output" and information concerning the measurement timing, included in the "A output". However, the synchronizing device (the network device 2b) is not limited to a device having measurement means and may be a device performing any processing in synchronization with the "A measurement".

Next, a network according to a second embodiment will be described with reference to FIGS. 4 and 5.

The network according to the second embodiment has a structure similar to that of the network in FIG. 1. According to the first embodiment, the measurement and calculation timing "T" of the network device 2a, which is the reference timing, is yielded from the timing when the output of the data "A output" is started. In contrast, according to the second embodiment, the measurement and calculation timing of the network device 2a, which is the reference timing, is detected on the basis of data included in the "A output".

Figure 4:
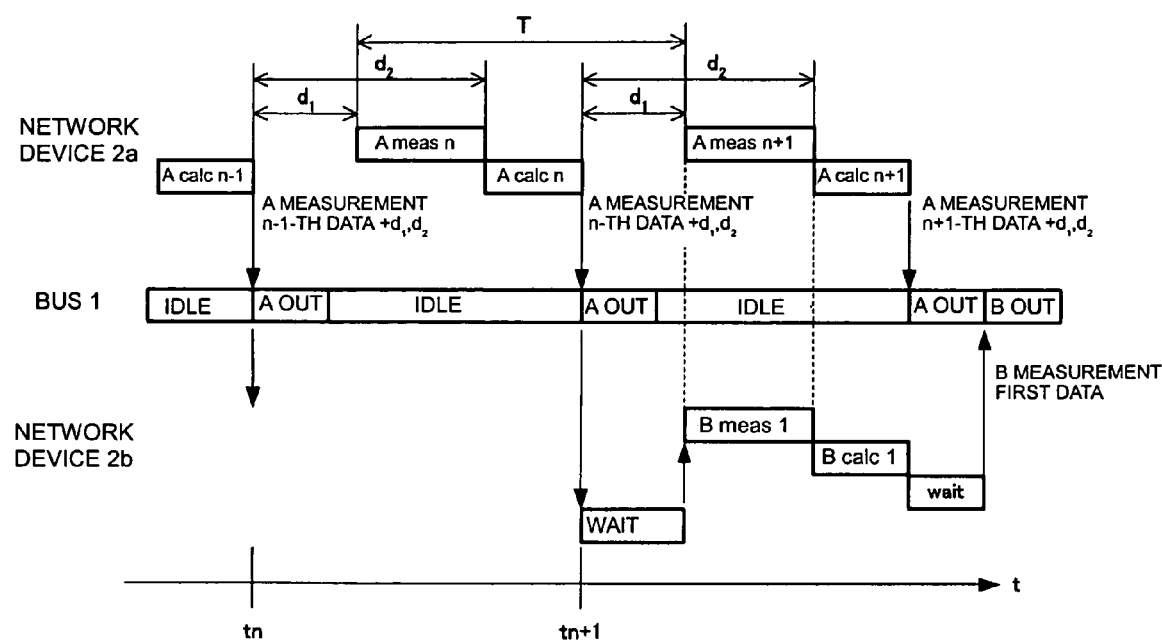
FIG. 4 is a timing chart showing how a bus and network devices operate in the network according to the second embodiment.

FIG. 4 is a timing chart of the bus and the network devices 2a and 2b in the network according to the second embodiment.

It is assumed that the network device 2a in FIG. 4 is a millimeter-wave radar and the network device 2b is a charge coupled device (CCD) camera. The network device 2a repeats the measurement and calculation at a predetermined period "T" and outputs the data "A output" on the bus 1 immediately after the calculation is terminated. The measurement timing of the network device 2a is unknown to the network device 2b at first.

First, the network device 2a starts the measurement after "d1" elapses from the time "t1" when the network device 2a outputs the previous measurement data on the bus 1, terminates the measurement after "d2" elapses from the time "t1", and performs the calculation without delay. After terminating the calculation, the network device 2a outputs the data "A output" on the bus 1. The "A output" includes information d1 indicating the start timing of the measurement and information d2 indicating the end timing of the measurement, in addition to the measurement data.

After starting the operation, the network device 2b detects the timing when the "A output" is started to be output on the bus 1 and extracts the information d1 and the information d2 concerning the measurement timing, included in the "A output".

The network device 2b waits until a time indicated by the "d1" elapses from the timing "tn+1" when the output of the "A output" is started and starts the measurement ("B measurement 1"). This measurement is terminated after a time indicated by the "d2" elapses from the timing "tn+1". The network device 2b then performs the calculation ("B calculation 1") to yield a calculation result.

The measurement ("B measurement 1") by the network device 2b is performed at the same timing as that of the measurement ("A measurement n+1") by the network device 2a.

After waiting for the bus 1 to be idle, the network device 2b outputs the measurement result "B output". The measurement result "B output" may include the information d1 indicating the start timing of the measurement and the information d2 indicating the end timing of the measurement, like the "A output".

The network device 2b detects the measurement and calculation timings of the network device 2a and performs the measurement and calculation in synchronization with the measurement and calculation timings of the network device 2a in the manner described above.

The time when the network device 2a starts the operation is not specifically limited. The network device 2a may start the operation after the network device 2a is ready for the operation, may start the operation immediately after the network device 2a detects an output from another certain network device, or may start the operation on the basis of the output information.

Figure 5:
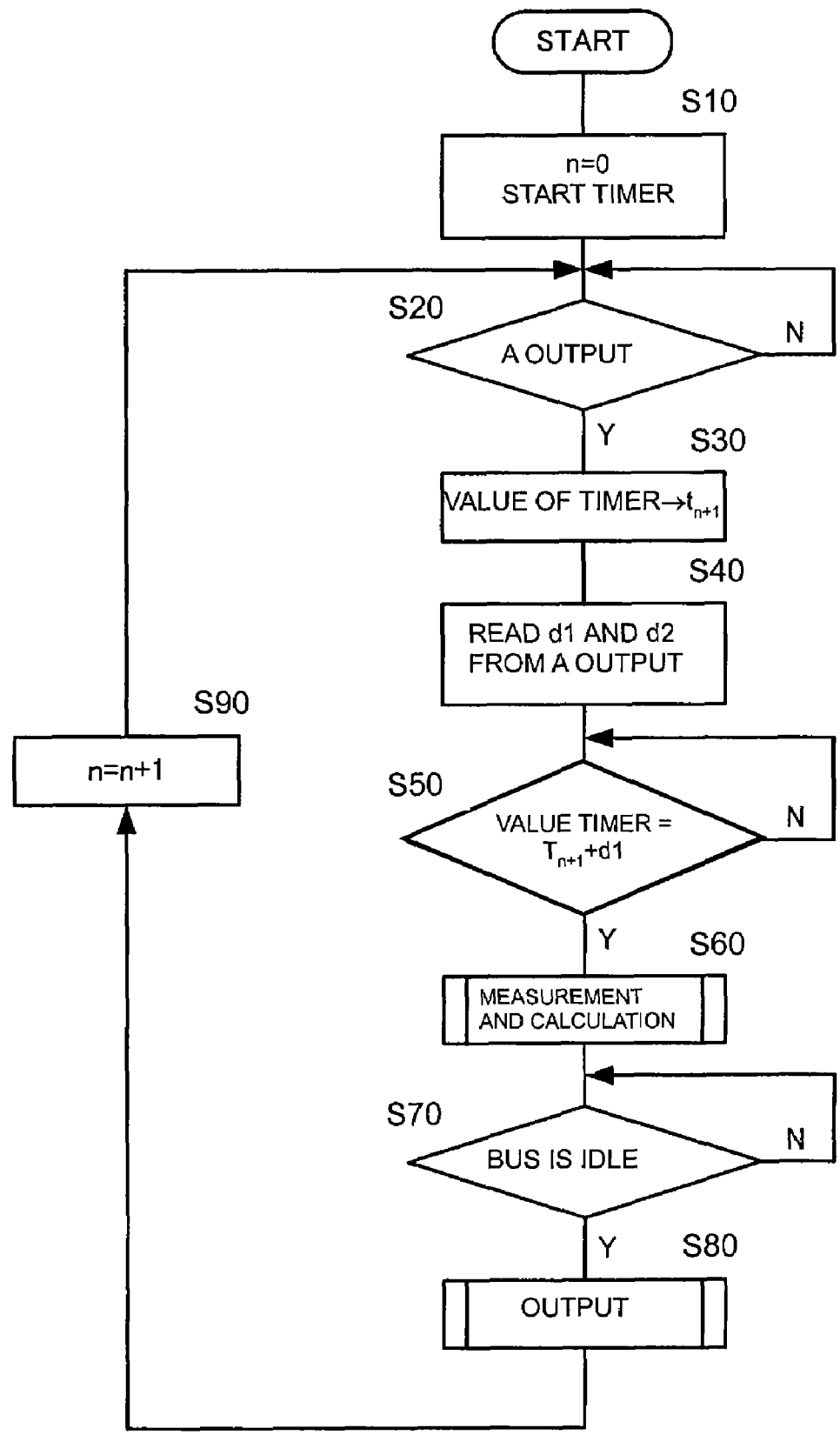
FIG. 5 is a flowchart showing a process of an arithmetic processor in a certain network device in the network according to the second embodiment.

FIG. 5 is a flowchart showing a process of the arithmetic processor 22 in the network device 2b, according to the second embodiment.

First, the arithmetic processor 22 substitutes an initial value of zero for a counted value "n" indicating how many times the measurement and the data output have been performed and starts the built-in timer (S10). Then, the arithmetic processor 22 waits until it is determined whether the "A output" is started to be output on the bus 1 (S20). If the controller 23 detects that the "A output" is started to be output on the bus 1, the arithmetic processor 22 holds the value of the built-in timer as "tn+1" (S30).

The arithmetic processor 22 reads out the information d1 and the information d2 concerning the measurement timing and waits for the value of the built-in timer to become "tn+1+d1" (S40→S50). If the value of the built-in timer becomes "tn+1+d1", the arithmetic processor 22 performs the measurement ("B measurement 1") and the calculation ("B calculation 1") (S60). Then, the arithmetic processor 22 determines whether the bus is idle. If the arithmetic processor 22 determines that the bus is not idle, the arithmetic processor 22 waits for the bus to be idle and outputs the measurement data "B output" on the bus 1 (S70→S80).

In preparation for the subsequent measurement and data output, the arithmetic processor 22 increments the counted value "n" by one and waits for start the subsequent "A output" (S90→S20).

The network device 2a and the network device 2b repeat the measurement and calculation in the predetermined cycle by repeating the above process.

Next, a network according to a third embodiment will be described with reference to FIGS. 6 and 7.

The network according to the third embodiment has a structure similar to that of the network in FIG. 1. According to the second embodiment, the time period "d1" from the timing when the network device 2a starts to output the measurement result to the time when the network device 2a starts the subsequent measurement and the time period "d2" from the timing when the network device 2a starts to output the measurement result to the time when the network device 2a terminates the measurement are constant. In contrast, the third embodiment is applicable also to a case where the information d1 and the information d2 concerning the measurement timing of the network device 2a are not constant.

Figure 6:
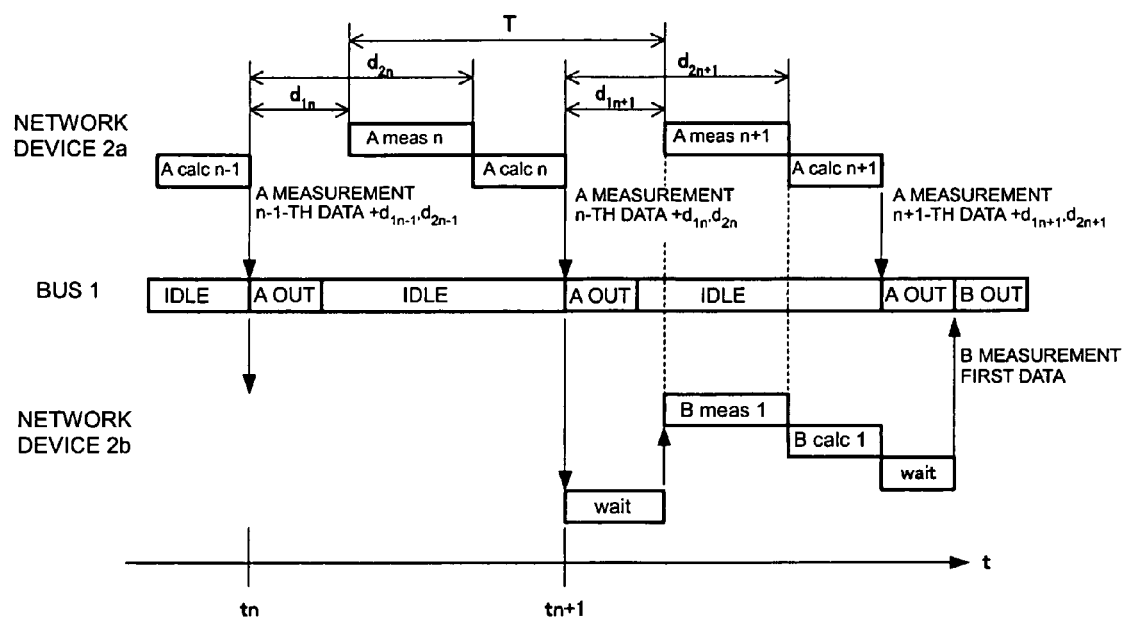
FIG. 6 is a timing chart showing how a bus and network devices operate in the network according to the third embodiment.

FIG. 6 is a timing chart of the bus and the network devices 2a and 2b in the network according to the third embodiment.

The network device 2a starts measurement ("A measurement n") at a time after "d1$n$" elapses from a time "tn" when the network device 2a outputs the previous measurement data on the bus 1, terminates the measurement at a time after "d2$n$" elapses from the time "tn", and immediately performs calculation ("A calculation n"). After the calculation is terminated, the network device 2a outputs measurement data "A output" at a time "tn+1" if no data exists on the bus 1 (idle state). This measurement data includes the information d1$n$ and the information d2$n$ concerning the measurement timing. Then, the network device 2a starts the measurement ("A measurement n+1") at a time "(tn+d1$n$+T)", terminates the "A measurement n+1" at a time "(tn+d2$n$+T)", and immediately performs the calculation ("A calculation n+1"). Reference numeral "T" denotes a measurement cycle of the network device 2a and is given by $T=(tn+d1n)-(tn-1+d1n-1)$. After the "A calculation n+1" is terminated, the network device 2a outputs the measurement data "A output" if no data exists on the bus 1 (idle state). This measurement data includes information d1$n$+1 and information d2$n$+1 concerning the measurement timing.

In contrast, after starting the operation, the network device 2b detects the timing "tn+1" when the "A output" is started to be output on the bus 1 and extracts the information d1$n$ and the information d2$n$ concerning the measurement timing, included in the "A output". Since the network device 2b also knows the measurement cycle "T" from $T=(tn+d1n)-(tn-1+d1n-1)$, the network device 2b waits until the time "(tn+d1$n$+T)" and performs the measurement ("B measurement 1") until the time "(tn+d2$n$+T)". Accordingly, the measurement ("B measurement 1") by the network device 2b is performed at the same timing as that of the measurement ("A measurement n+1") by the network device 2a.

Then, the network device 2b performs the calculation ("B calculation 1") to yield a measurement result, waits for the bus 1 to be idle, and outputs the measurement result "B output".

Figure 7:
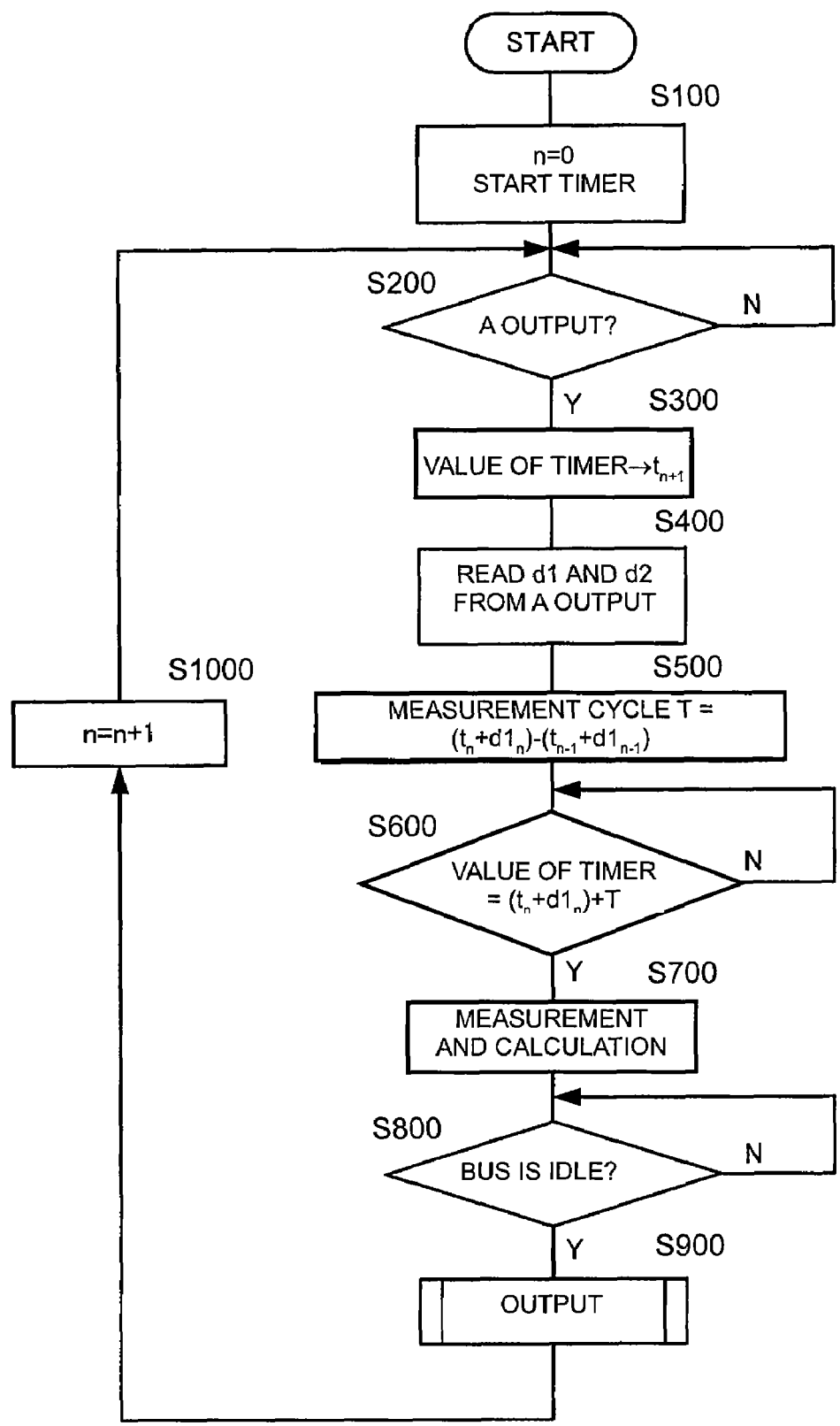
FIG. 7 is a flowchart showing a process of an arithmetic processor in a certain network device in the network according to the third embodiment.

FIG. 7 is a flowchart showing a process in the arithmetic processor 22 in the network device 2b, according to the third embodiment.

First, the arithmetic processor 22 substitutes an initial value of zero for a counted value "n" indicating how many times the measurement and the data output have been performed and starts the built-in timer (S100). Then, the arithmetic processor 22 waits until it is determined whether the "A output" is started to be output on the bus 1 (S200). If the controller 23 detects that the "A output" is started to be output on the bus 1, the arithmetic processor 22 holds the value of the built-in timer as "tn+1" (S300).

The arithmetic processor 22 reads out the information d1$n$ and the information d2$n$ concerning the measurement timing from the "A output" and calculates a measurement cycle "T" by $T=(tn+d1n)-(tn-1+d1n-1)$ (S400→S500). Here, "tn" denotes a timing when start of the previous "A output" is detected, "tn-1" denotes a timing when start of the second previous "A output" is detected, and "d1$n$" denotes a value read from the "A output" output at the timing "tn+1.

Then, the arithmetic processor 22 waits for the value of the built-in timer to become "(tn+d1$n$+T)" (S600). If the value of the built-in timer becomes "(tn+d1$n$+T)", the arithmetic processor 22 performs the measurement ("B measurement 1") and the calculation ("B calculation 1") (S700). The arithmetic processor 22 determines whether the bus is idle. If the arithmetic processor 22 determines that the bus is not idle, the arithmetic processor 22 waits for the bus to be idle and outputs the measurement data "B output" on the bus 1 (S800→S900).

In preparation for the subsequent measurement and data output, the arithmetic processor 22 increments the counted value "n" by one and waits for start of the subsequent "A output" (S1000→S200).

The network device 2b repeats the measurement and calculation in synchronization with the network device 2a in the manner described above, even when the time period from the start of the "A output" to the start of the "A measurement" is inconstant.

The network device 2b detects the measurement and calculation cycle "T" of the network device 2a and performs the measurement and calculation at the same timings as the network device 2a, in synchronization with the start and end timings of the subsequent measurement with respect to the timing when the previous measurement data is started to be output from the network device 2a.

We claim:

1. A network comprising:
a bus through which data is transmitted; and
a plurality of network devices connected to the bus,
wherein a first network device of the plurality of network devices includes a measurement portion that measures a first variable in a predetermined measurement cycle and a data output portion that outputs a first result measured by the measurement portion on the bus, and
wherein a second network device of the plurality of network devices includes a detecting portion that detects the predetermined cycle from a plurality of timings when the result is output on the bus, a measurement section that measures a second variable at measurement timings based on the predetermined cycle, and a data output section that outputs a second result measured by the measurement section on the bus when the bus is idle.

2. A network including comprising:
a bus through which data is transmitted; and
a plurality of network devices connected to the bus,
wherein a first network device of the plurality of network devices includes a measurement portion that measures a variable at measurement timings based on a predetermined reference timing and a data output portion that adds measurement timing information to a first result measured by the measurement portion and outputs the first result on the bus when the bus is idle.

3. The network according to claim 2, wherein a second network device of the network devices includes a measurement section that measures a second variable at measurement timings based on the measurement timing information added to the first result with respect to a base time when the first result is output, and a data output section that outputs a second result measured by the measurement section on the bus when the bus is idle.

4. The network according to claim 2, wherein the predetermined reference timing is a timing generated by at least one of the network devices.

5. The network according to claim 2, wherein the predetermined reference timing is a timing when a certain network device, among the plurality of network devices, outputs a signal on the bus.

* * * * *